United States Patent
Huang et al.

(10) Patent No.: US 11,177,979 B2
(45) Date of Patent: Nov. 16, 2021

(54) SYNCHRONIZING ROUTE

(71) Applicant: NEW H3C TECHNOLOGIES CO., LTD., Hangzhou (CN)

(72) Inventors: Liwei Huang, Beijing (CN); Wei Wang, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 90 days.

(21) Appl. No.: 16/626,825

(22) PCT Filed: Jun. 26, 2018

(86) PCT No.: PCT/CN2018/092730
§ 371 (c)(1),
(2) Date: Dec. 26, 2019

(87) PCT Pub. No.: WO2019/001397
PCT Pub. Date: Jan. 3, 2019

(65) Prior Publication Data
US 2020/0136863 A1 Apr. 30, 2020

(30) Foreign Application Priority Data
Jun. 26, 2017 (CN) .......................... 201710494639.3

(51) Int. Cl.
H04L 12/46 (2006.01)
H04L 12/721 (2013.01)
(Continued)

(52) U.S. Cl.
CPC ...... *H04L 12/4641* (2013.01); *H04L 12/4633* (2013.01); *H04L 45/66* (2013.01); *H04L 45/74* (2013.01); *H04L 61/2592* (2013.01)

(58) Field of Classification Search
CPC . H04L 12/4641; H04L 12/4633; H04L 45/66; H04L 45/74; H04L 61/2592; H04L 45/08; H04L 45/54
See application file for complete search history.

(56) References Cited

U.S. PATENT DOCUMENTS

2017/0078198 A1    3/2017  Nellikar et al.
2017/0295130 A1*  10/2017  Mahajan ............. H04L 12/4641
(Continued)

FOREIGN PATENT DOCUMENTS

CN    103227745 A    7/2013
CN    106059946 A   10/2016
(Continued)

OTHER PUBLICATIONS

"Juniper Networks EVPN Implementation for Next-Generation Data Center Architectures," Juniper Website, Available Online at https://www.juniper.net/assets/us/en/local/pdf/whitepapers/2000606-en.pdf, Jul. 31, 2015, 62 pages.
(Continued)

Primary Examiner — Habte Mered
(74) Attorney, Agent, or Firm — McCoy Russell LLP

(57) ABSTRACT

In an example of a method of synchronizing a route, a first VTEP in a first EVPN learns an address of a first VM connected with the first VTEP; sends the learned address to a second VTEP connected with the first VTEP via a first EVPN route, where the second VTEP belongs to any of the first EVPN and a second EVPN of a different level from the first EVPN; receives a second EVPN route carrying an address of a second VM and a destination IP address for establishing a VXLAN tunnel; creates a route entry containing the address of the second VM, and nexthop information contained in the route entry is the destination IP address carried in the second EVPN route; and establishes a VXLAN tunnel between the first VTEP and a VTEP iden-
(Continued)

tified by the destination IP address carried in the second EVPN route.

18 Claims, 4 Drawing Sheets

(51) Int. Cl.
  *H04L 12/741* (2013.01)
  *H04L 29/12* (2006.01)

(56) References Cited

U.S. PATENT DOCUMENTS

| | | | | |
|---|---|---|---|---|
| 2017/0317919 A1* | 11/2017 | Fernando | ............ | H04L 41/0806 |
| 2018/0248795 A1* | 8/2018 | Nainar | ................ | H04L 12/4641 |
| 2019/0034226 A1* | 1/2019 | Gao | .................... | H04L 12/4641 |

FOREIGN PATENT DOCUMENTS

| | | | |
|---|---|---|---|
| CN | 106453025 | A | 2/2017 |
| CN | 106878136 | A | 6/2017 |
| JP | 2005340937 | A | 12/2005 |
| WO | 2016066119 | A1 | 5/2016 |

OTHER PUBLICATIONS

ISA State Intellectual Property Office of the People's Republic of China, Written Opinion of the International Searching Authority Issued in Application No. PCT/CN2018/092730, dated Sep. 14, 2018, WIPO, 9 pages.

European Patent Office, Extended European Search Report Issued in Application No. 18824679.7, dated Apr. 6, 2020, Germany, 10 pages.

Sajassi, A. et al., "A Network Virtualization Overlay Solution using EVPN," L2VPN Workgroup Internet-Draft, Nov. 10, 2014, 24 pages.

ISA State Intellectual Property Office of the People's Republic of China, International Search Report Issued in Application No. PCT/CN2018/092730, dated Sep. 14, 2018, WIPO, 4 pages.

State Intellectual Property Office of the People's Republic of China, Office Action and Search Report Issued in Application No. 201710494639.3, dated May 5, 2019, 6 pages. (Submitted with Partial Translation).

European Patent Office, Office Action Issued in Application No. 18824679.7, dated Dec. 3, 2020, Germany, 5 pages.

Japanese Patent Office, Office Action Issued in Application No. 2019-571660, dated Dec. 22, 2020, 7 pages. (Submitted with Machine Translation).

\* cited by examiner

SYNCHRONIZING ROUTE

CROSS-REFERENCE TO RELATED APPLICATIONS

The present application is a U.S. National Phase of International Patent Application Serial No. PCT/CN2018/092730 entitled "ROUTE SYNCHRONIZATION," filed on Jun. 26, 2018. International Patent Application Serial No. PCT/CN2018/092730 claims priority to Chinese Patent Application No. 201710494639.3, filed on Jun. 26, 2017. The entire contents of each of the above-cited applications are hereby incorporated by reference in their entirety for all purposes.

BACKGROUND

Ethernet Virtual Private Network (EVPN) is a layer-2 Virtual Private Network (VPN) technology. On a control plane, VXLAN Tunnel End Points (VTEPs) may establish an EVPN neighbor relationship therebetween to advertise an EVPN route to each other. On a data plane, the VTEPs may forward user packets in a Virtual eXtensible LAN (VXLAN) encapsulation manner.

DETAILED DESCRIPTION OF THE EMBODIMENTS

Figure 1:
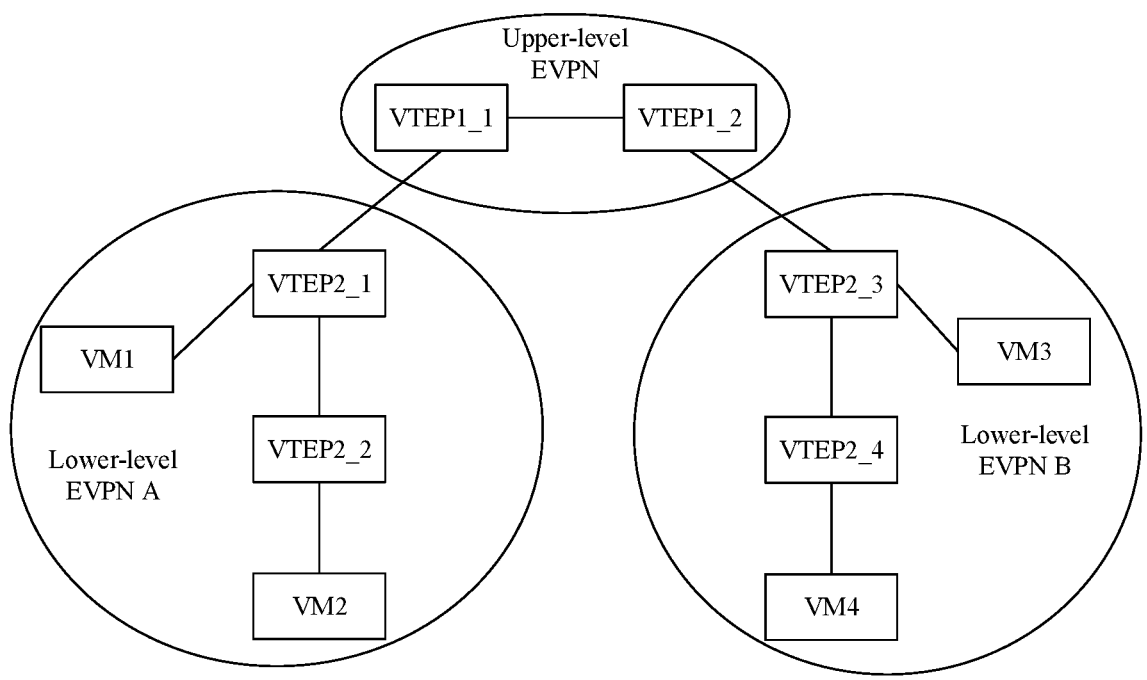
FIG. 1 is a schematic diagram illustrating an architecture of an EVPN network according to an example of the present disclosure.

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

Illustrative examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

To achieve hierarchical management for EVPNs, a method of synchronizing a route and an apparatus to which the method is applied are provided in an example of the present disclosure. In the example of the present disclosure, a networking architecture with multi-level EVPNs is established. As shown in FIG. 1, the networking architecture may include an upper-level EVPN and a lower-level EVPN. A VTEP in the upper-level EVPN is connected with at least one lower-level EVPN (in FIG. 1, a VTEP in the upper-level EVPN is merely connected with one lower-level EVPN for an example); a VTEP in the lower-level EVPN (also referred to as a first VTEP) is connected with a Virtual Machine (VM), and/or a VTEP in the upper-level EVPN, and/or at least one another VTEP in the lower-level EVPN to which the first VTEP belongs.

FIG. 1 merely shows a networking architecture with two levels of EVPNs. It is apparent that a networking architecture with three and more levels of EVPNs may also be constructed to meet an actual network demand. With the networking architecture shown in FIG. 1, a tenant such as an enterprise may be subdivided, for example, an enterprise network may be further divided into a plurality of department networks, each of which corresponds to a lower-level EVPN. The tenant refers to a client, which uses device and network resources to get relevant services. Different tenants have their own device resources, network topologies, service plans, and the like.

Figure 2:
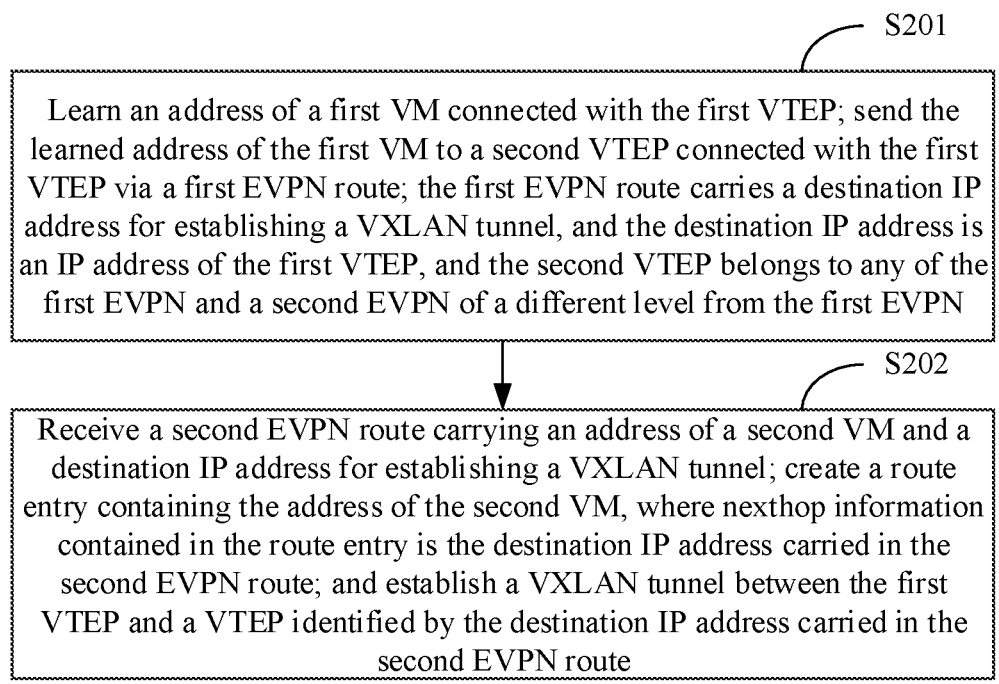
FIG. 2 is a flowchart illustrating a method of synchronizing a route according to an example of the present disclosure.

As shown in FIG. 2, a method of synchronizing a route executed by a lower-level VTEP (also referred to as a first VTEP) according to an example of the present disclosure may include the following blocks.

At block S201, a first VTEP in a first EVPN learns an address of a first VM connected with the first VTEP; sends the learned address of the first VM to a second VTEP connected with the first VTEP via a first EVPN route; the first EVPN route carries a destination IP address for establishing a VXLAN tunnel, and the destination IP address is an IP address of the first VTEP, and the second VTEP belongs to any of the first EVPN and a second EVPN of a different level from the first EVPN.

In an example, a lower-level VTEP may learn an address of a local VM; if the lower-level VTEP is connected to another VTEP in an EVPN to which it belongs, it may send the learned address to the another VTEP via a first EVPN route; and if the lower-level VTEP is connected to another VTEP in an EVPN of a different level, it may send the learned address to the another VTEP in an EVPN of a different level via the first EVPN route; the first EVPN route carries a destination IP address for establishing a VXLAN tunnel, and the destination IP address is an IP address of the lower-level VTEP.

At block S202, the first VTEP receives a second EVPN route carrying an address of a second VM and a destination IP address for establishing a VXLAN tunnel; creates a route entry containing the address of the second VM, where next hop information contained in the route entry is the destination IP address carried in the second EVPN route; and establishes a VXLAN tunnel between the first VTEP and a VTEP identified by the destination IP address carried in the second EVPN route.

In an example, the lower-level VTEP receives a second EVPN route and creates a route entry containing a VM address carried in the second EVPN route, where next hop information contained in the route entry is a destination IP address carried in the second EVPN route; and establishes a VXLAN tunnel between the lower-level VTEP and a VTEP identified by the destination IP address carried in the second EVPN route.

According to a method in an example of the present disclosure, there is provided a networking architecture with multi-level EVPNs including an upper-level EVPN and a lower-level EVPN, where a VTEP in the upper-level EVPN is connected with at least one lower-level EVPN, and a VTEP in the lower-level EVPN is connected with a VM, and/or a VTEP in the upper-level EVPN, and/or at least one another VTEP in the lower-level EVPN to which the VTEP belongs. In such a networking architecture with multi levels of EVPNs, a VTEP serving as a route sender (abbreviated as a sender VTEP) may synchronize a learned address of a local VM to another VTEP in an EVPN to which the sender VTEP belongs and/or another VTEP in an EVPN of a different level via an EVPN route, where the EVPN route carries a destination IP address for establishing a VXLAN tunnel and the destination IP address is an IP address of the sender VTEP. The another VTEP which receives the EVPN route may create a corresponding route entry, and set next hop information in the route entry as the destination IP address carried in the received EVPN route (i.e. the IP address of the sender VTEP), and may also establish a VXLAN tunnel between the another VTEP and the sender VTEP. By adopting a networking architecture with multi levels of VTEPs, hierarchical management of EVPNs is achieved.

In an example, when the second EVPN route is received, if the lower-level VTEP is connected to another VTEP in an EVPN of a different level, it may forward the second EVPN route to the another VTEP in the EVPN of a different level; if the lower-level VTEP is connected to another VTEP in an EVPN to which the lower-level VTEP belongs, it may forward the second EVPN route to the another VTEP in the EVPN to which the lower-level VTEP belongs. In this way, a received EVPN route can be continuously diffused in an EVPN to which a lower-level VTEP belongs or in an EVPN of a different level.

In an example, an upper-level VTEP may receive a third EVPN route, where the third EVPN route carries a destination IP address for establishing a VXLAN tunnel. If the upper-level VTEP is connected to another VTEP in an EVPN to which the upper-level VTEP belongs, the upper-level VTEP may forward the third EVPN route to the another VTEP in the EVPN to which the upper-level VTEP belongs; if the upper-level VTEP is connected to another VTEP in an EVPN of a different level, the upper-level VTEP may forward the third EVPN route to the another VTEP in the EVPN of a different level. In this way, an upper-level EVPN serves as a network over a lower-level EVPN, and an upper-level VTEP in the upper-level EVPN may not perform management and maintenance for VM route information in the lower-level EVPN but forward the VM route information in the lower-level EVPN. A VTEP in the lower-level EVPN may perform management and maintenance for VM route information of the tenant, thereby saving VTEP resources and reducing workload of VTEPs.

In an example, in the network shown in FIG. 1, an upper-level EVPN may include a VTEP1_1 and a VTEP1_2, where the VTEP1_1 is connected to a lower-level EVPN A, and the VTEP1_2 is connected to a lower-level EVPN B. In the lower-level EVPN A, a VTEP2_1 accesses the VTEP1_1 in the upper-level EVPN, a virtual machine VM1 accesses the VTEP2_1, and a virtual machine VM2 accesses a VTEP2_2. In the lower-level EVPN B, a VTEP2_3 accesses the VTEP1_2 in the upper-level EVPN, a virtual machine VM3 accesses the VTEP2_3, and a virtual machine VM4 accesses a VTEP2_4. The lower-level EVPN A and the lower-level EVPN B both belong to a same tenant.

An EVPN neighbor relationship may be established between VTEPs in a same EVPN so that the VTEPs can advertise an EVPN route to each other; a Multiprotocol Border Gateway Protocol (MP-BGP) neighbor relationship may be established between VTEPs in EVPNs of different levels so that the VTEPs in the EVPNs of different levels can advertise an MP-BGP route to each other. In this way, an EVPN neighbor relationship is established between the VTEP1_1 and the VTEP1_2, both of which belong to the upper-level EVPN; an EVPN neighbor relationship is established between the VTEP2_1 and the VTEP2_2, both of which belong to the lower-level EVPN A; and an EVPN neighbor relationship is established between the VTEP2_3 and the VTEP2_4, both of which belong to the lower-level EVPN B. An MP-BGP neighbor relationship is established between the VTEP1_1 in the upper-level EVPN and the VTEP2_1 in the lower-level EVPN A, and an MP-BGP neighbor relationship is established between the VTEP1_2 in the upper-level EVPN and the VTEP2_3 in the lower-level EVPN B.

Figure 3:
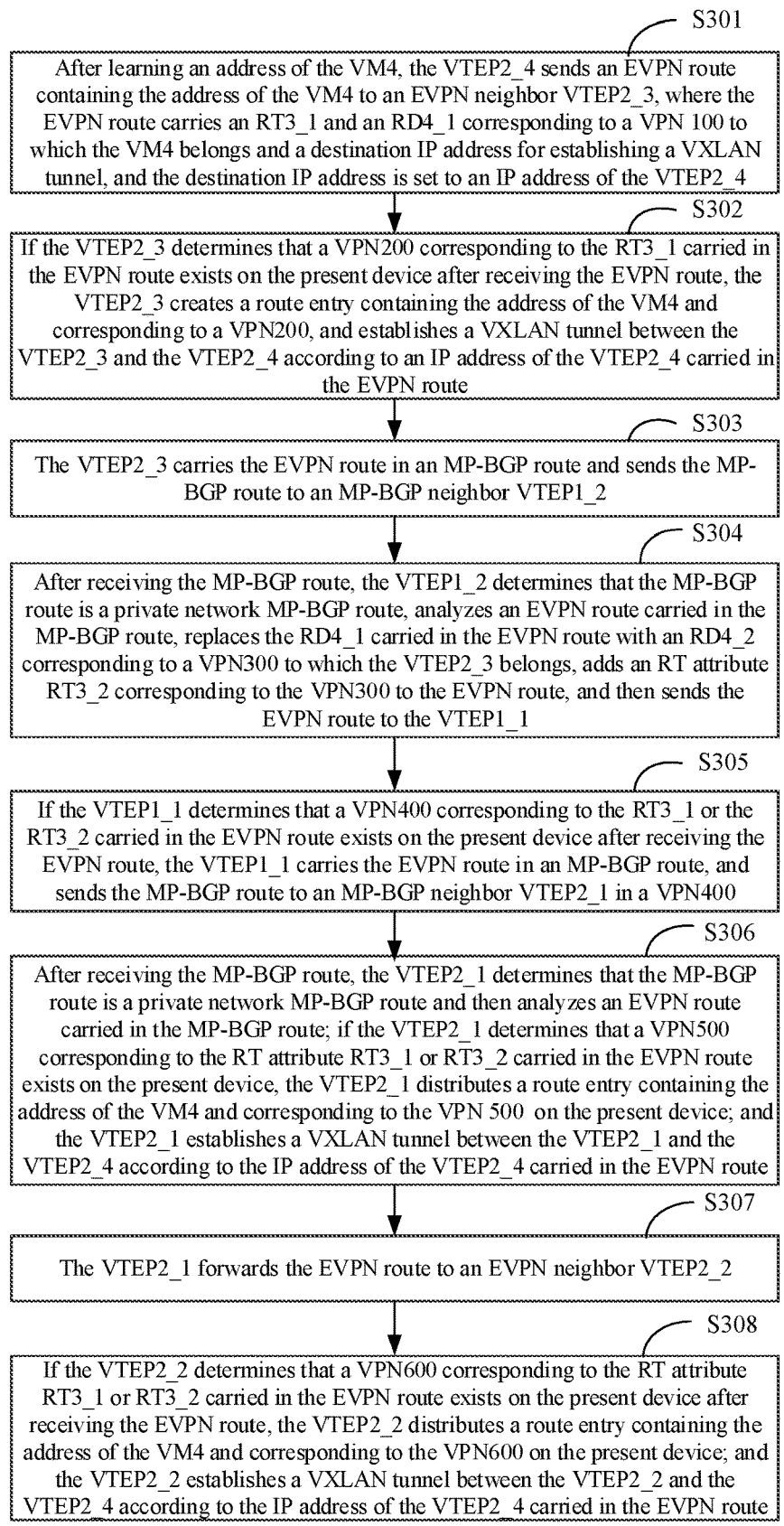
FIG. 3 is a flowchart illustrating a method of synchronizing a route in the EVPN network shown in FIG. 1 according to an example of the present disclosure.

Based on the network shown in FIG. 1, a method of synchronizing a route according to an example of the present disclosure may include the following blocks as shown in FIG. 3.

At block S301, after learning an address of the VM4, the VTEP2_4 sends an EVPN route containing the address of the VM4 to an EVPN neighbor VTEP2_3. The EVPN route carries a RT3_1 and an RD4_1 corresponding to a VPN 100 to which the VM4 belongs, and a destination IP address for establishing a VXLAN tunnel where the destination IP address is set as an IP address of the VTEP2_4.

After learning an MAC address VM4-MAC and an IP address VM4-IP of the VM4, the VTEP2_4 may send, via an EVPN route, the MAC address and the IP address of the VM4 to the VTEP2_3 in the lower-level EVPN B to which the VTEP2_4 belongs.

In an example, an EVPN route may be extended to carry a destination IP address for establishing a VXLAN tunnel. For example, an EVPN route may be added with a nexthop field, in which a destination IP address for establishing a VXLAN tunnel is carried. The destination IP address is an IP address of a lower-level VTEP sending the EVPN route, and the IP address of the lower-level VTEP may be an IP address used by the lower-level VTEP to establish an EVPN neighbor relationship. Below, as an example, an IP address used to establish an EVPN neighbor relationship is used for description. Thus, at block S301, what is carried in the EVPN route sent by the VTEP2_4 is as shown in Table 1.

TABLE 1

| RT(Route Target) | RD (Route Distinguisher) | Nexthop | MAC address | IP address |
|---|---|---|---|---|
| RT3_1 | RD4_1 | VTEP2_4-IP | VM4-MAC | VM4-IP |

In Table 1, the RT3_1 is a RT corresponding to the VPN100 to which the VM4 belongs, the RD4_1 is an RD corresponding to the VPN100 to which the VM4 belongs, and the VTEP2_4-IP is an IP address used by the VTEP2_4 to establish an EVPN neighbor relationship. For a VPN route, its transmission and filtering are decided by a RT attribute, and a Provider Edge (PE) device may distinguish routes between different VPNs by means of a RT attribute. Also, VPNs and RTs may be in a many-to-many relationship. An RD attribute is configured to identify different VPN instances on a PE device so as to realize an address multiplexing between the VPN instances. Apparently, an EVPN route may also carry information such as an MPLS label, which is not described in detail here. A VPN to which the VM4 belongs is a VPN to which an interface on the VTEP2_4 and connected to the VM4 belongs.

At block S302, the VTEP2_3 receives the EVPN route; if the VTEP2_3 determines that a VPN200 corresponding to the RT3_1 carried in the EVPN route exists on the present device, the VTEP2_3 creates a route entry (as shown in Table 2) corresponding to a VPN200 which contains the address of the VM4; and establishes a VXLAN tunnel between the VTEP2_3 and the VTEP2_4 according to an IP address of the VTEP2_4 carried in the EVPN route.

TABLE 2

| VPN ID | IP address | MAC address | Nexthop information |
|---|---|---|---|
| VPN200 | VM4-IP | VM4-MAC | VTEP2_4-IP |

At block S302, the VTEP2_3 may establish a VXLAN tunnel (denoted as Tunnel10) with a source IP address as an IP address VTEP2_3-IP used by the VTEP2_3 to establish an EVPN neighbor relationship and a destination IP address as an IP address VTEP2_4-IP used by the VTEP2_4 to establish an EVPN neighbor relationship according to the VTEP2_4-IP carried in the nexthop field of the EVPN route, thereby establishing the VXLAN tunnel Tunnel10 between the VTEP2_3 and the VTEP2_4.

If the virtual machine VM3 accessing the VTEP2_3 belongs to the VPN200, the VM3 and the VM4 can communicate via the VXLAN tunnel Tunnel10 between the VTEP2_3 and the VTEP2_4.

At block S303, the VTEP2_3 carries the EVPN route in an MP-BGP route and sends the MP-BGP route to an MP-BGP neighbor VTEP1_2.

In an example of the present disclosure, a route type is newly added to extend existing MP-BGP route types. For convenience of description, the added route type may be referred to as a private network MP-BGP route, and indicates that an EVPN route in a lower-level EVPN is carried. For example, the MP-BGP route sent by the VTEP2_3 at block S303 has a format of Type Length Value (TLV).

The Type field is used to indicate a type of the MP-BGP route, and the value of the Type may be set to a specific value indicating that the type of the MP-BGP route is a private network MP-BGP route, and an EVPN route in a lower-level EVPN, i.e. an EVPN route synchronized from a private network side, is carried in the MP-BGP route.

The Length field is used to indicate a length of the Value field.

The Value field is used to carry specific content of the MP-BGP route. In the example, the specific content of the MP-BGP route include EVPN route content as shown in Table 1.

At block S304, after receiving the MP-BGP route, the VTEP1_2 determines that the MP-BGP route is a private network MP-BGP route, analyzes an EVPN route carried in the MP-BGP route, replaces the RD4_1 carried in the EVPN route with an RD4_2 corresponding to a VPN300 (i.e. a VPN to which an interface connected to the VTEP2_3 on the VTEP1_2 belongs) to which the VTEP2_3 belongs, adds a RT attribute RT3_2 corresponding to the VPN300 to the EVPN route, and then sends the EVPN route to the VTEP1_1.

At this time, the EVPN route sent by the VTEP1_2 carries RT attributes RT3_1 and RT3_2.

At block S305, if the VTEP1_1 determines that a VPN400 corresponding to the RT3_1 or the RT3_2 carried in the EVPN route exists on the present device after receiving the EVPN route, the VTEP1_1 carries the EVPN route in an MP-BGP route, and sends the MP-BGP route to an MP-BGP neighbor VTEP2_1 in a VPN400. An interface that is on the VTEP1_1 and connected to the VTEP2_1 belongs to the VPN 400.

The MP-BGP route sent by the VTEP1_1 is a private network MP-BGP route.

At block S306, after receiving the MP-BGP route, the VTEP2_1 determines that the MP-BGP route is a private network MP-BGP route and then analyze an EVPN route carried in the MP-BGP route; if the VTEP2_1 determines that a VPN500 corresponding to the RT attribute RT3_1 or RT3_2 carried in the EVPN route exists on the present device, the VTEP2_1 distributes a route entry containing the address of the VM4 and corresponding to the VPN 500 on the present device, as shown in Table 3; and the VTEP2_1 establishes a VXLAN tunnel between the VTEP2_1 and the VTEP2_4 according to the IP address of the VTEP2_4 carried in the EVPN route.

TABLE 3

| VPN ID | IP address | MAC address | Nexthop |
|---|---|---|---|
| VPN500 | VM4-IP | VM4-MAC | VTEP2_4-IP |

At block S306, the VTEP2_1 may establish a VXLAN tunnel (denoted as Tunnel20) according to the VTEP2_4-IP carried in the nexthop field of the EVPN route, where a source IP address of the established VXLAN tunnels is an IP address VTEP2_1-IP used by the VTEP2_1 to establish an EVPN neighbor relationship, and an destination IP address of the established VXLAN tunnel is an IP address VTEP2_4-IP used by the VTEP2_4 to establish an EVPN neighbor relationship, thereby establishing the VXLAN tunnel Tunnel20 between the VTEP2_1 and the VTEP2_4.

If the virtual machine VM1 accessing the VTEP2_1 belongs to the VPN500, the VM1 and the VM4 may communicate with each other via the VXLAN tunnel Tunnel20 between the VTEP2_1 and the VTEP2_4.

At block S307, the VTEP2_1 forwards the EVPN route to an EVPN neighbor VTEP2_2.

At block S308, if the VTEP2_2 determines that a VPN600 corresponding to the RT attribute RT3_1 or RT3_2 carried in the EVPN route exists on the present device after receiving the EVPN route, the VTEP2_2 distributes a route entry containing the address of the VM4 and corresponding to the VPN600 on the present device as shown in Table 4; and the VTEP2_2 establishes a VXLAN tunnel between the VTEP2_2 and the VTEP2_4 according to the IP address of the VTEP2_4 carried in the EVPN route.

TABLE 4

| VPN ID | IP address | MAC address | nexthop |
|---|---|---|---|
| VPN600 | VM4-IP | VM4-MAC | VTEP2_4-IP |

At block S308, the VTEP2_2 may establish a VXLAN tunnel (denoted as Tunnel30) according to the VTEP2_4-IP carried in the nexthop field of the EVPN route, where a source IP address of the established tunnel is an IP address VTEP2_2-IP used by the VTEP2_2 to establish an EVPN neighbor relationship, and a destination IP address of the established tunnel is an IP address VTEP2_4-IP used by the VTEP2_4 to establish an EVPN neighbor relationship, thereby establishing the VXLAN tunnel Tunnel30 between the VTEP2_2 and the VTEP2_4.

If the virtual machine VM2 accessing the VTEP2_2 belongs to the VPN600, the VM2 and the VM4 can communicate with each other via the VXLAN tunnel Tunnel30 between the VTEP2_2 and the VTEP2_4.

According to the method of the above example, an original EVPN can be taken as an upper-level EVPN, and tenants managed by the upper-level EVPN can be subdivided so that a plurality of lower-level EVPNs constitute a tenant. And an EVPN route may be synchronized between lower-level EVPNs by means of the upper-level EVPN, thus achieving hierarchical management of an EVPN.

Figure 4:
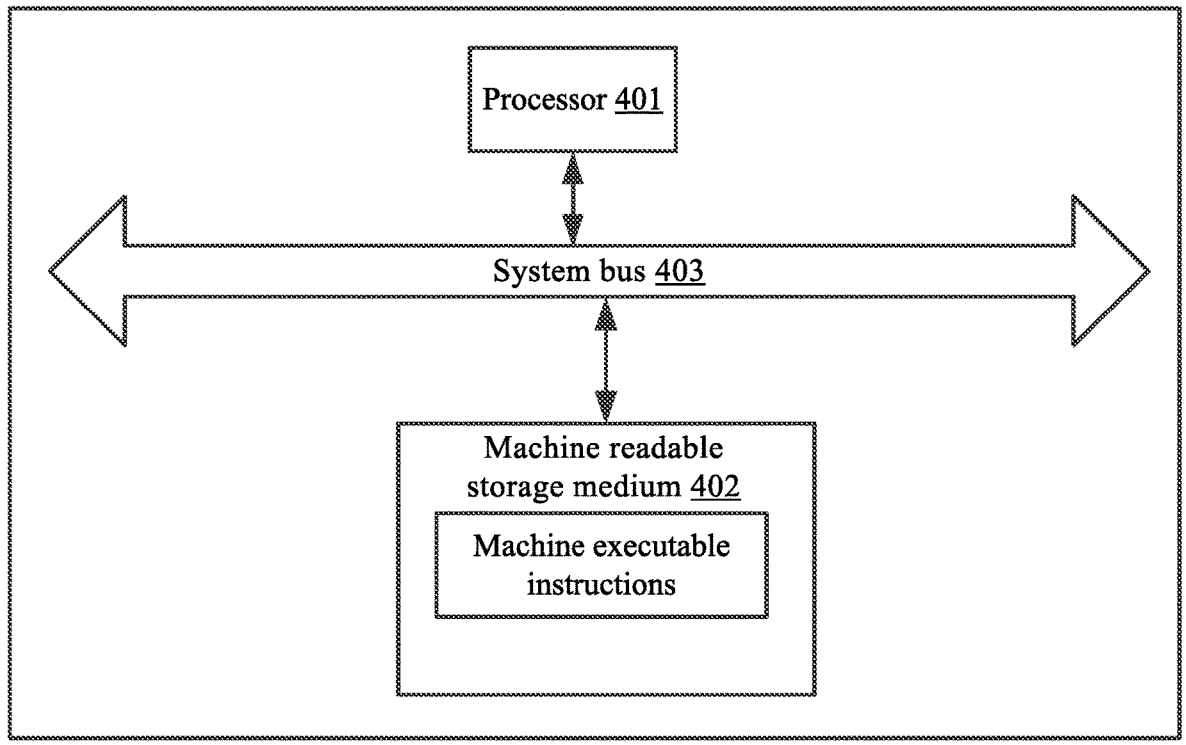
FIG. 4 is a schematic diagram illustrating a hardware structure of an apparatus for synchronizing a route according to an example of the present disclosure.

Corresponding to examples of the above method of synchronizing a route, the present disclosure also provides an example of an apparatus for synchronizing a route. The apparatus may be applied to a VTEP. FIG. 4 is a schematic diagram illustrating a hardware structure of an apparatus for synchronizing a route according to an example of the present disclosure. As shown in FIG. 4, the apparatus for synchronizing a route may include: a processor 401 and a machine-readable storage medium 402 storing machine-executable instructions. The processor 401 may communicate with the machine-readable storage medium 402 via a system bus 403. Moreover, by reading and executing the machine-executable instructions on the machine-readable storage medium 402, the processor 401 can execute the above-described method of synchronizing a route.

Here, the machine-readable storage medium 402 may be any of electronic, magnetic, optical or other physical storage mediums 402 that can contain or store information such as executable instructions, data, and the like. For example, the machine-readable storage medium may be: a Random Access Memory (RAM), a volatile memory, a nonvolatile memory, a flash memory, a storage drive (e.g. hard disk drive), a solid state hard disk, any type of storage disk (e.g., optical disk, Digital Video Disk (DVD)), or a similar storage medium, or a combination thereof.

Figure 5:
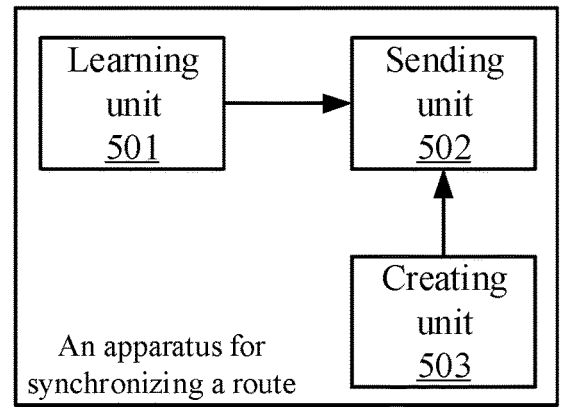
FIG. 5 is a schematic diagram illustrating a functional structure of an apparatus for synchronizing a route according to an example of the present disclosure.

The present disclosure also provides a machine-readable storage medium containing machine-executable instructions, for example, the machine-readable storage medium 402 shown in FIG. 4, where the machine-executable instructions may be executed by the processor 401 in the apparatus for synchronizing a route to implement the above method of synchronizing a route. As shown in FIG. 5, the apparatus for synchronizing a route provided in an example of the present disclosure may functionally include: a learning unit 501, a sending unit 502 and a creating unit 503.

The learning unit 501 is configured to learn an address of a first VM connected with a first VTEP.

The sending unit 502 is configured to send the learned address of the first VM to a second VTEP connected with the first VTEP via a first EVPN route after the learning unit 501 learns the address of the first VM, where the first EVPN route carries a destination IP address for establishing a VXLAN tunnel, and the destination IP address is an IP address of the first VTEP, and the second VTEP belongs to any of a first EVPN and a second EVPN of a different level from the first EVPN.

The creating unit 503 is configured to receive a second EVPN route carrying an address of a second VM and a destination IP address for establishing a VXLAN tunnel; create a route entry containing the address of the second VM, where nexthop information contained in the route entry is the destination IP address carried in the second EVPN route; and establish a VXLAN tunnel between the first VTEP and a VTEP identified by the destination IP address carried in the second EVPN route.

An EVPN neighbor relationship may be established between VTEPs in a same EVPN, and an MP-BGP neighbor relationship may be established between VTEPs in EVPNs of different levels.

In the case that the second VTEP belongs to the second EVPN, the sending unit 502 may be specifically configured to send the learned address of the first VM to the second VTEP via the first EVPN route by: carrying the first EVPN route in an MP-BGP route and sending the MP-BGP route to the second VTEP, where a private network identifier in the MP-BGP route is used to indicate that an EVPN route is carried in the MP-BGP route.

The creating unit 503 is specifically configured to receive the second EVPN route by: receiving the second EVPN route from a VTEP establishing an EVPN neighbor relationship with the first VTEP; or receiving the MP-BGP route from a VTEP establishing an MP-BGP neighbor relationship with the first VTEP; and acquiring the second EVPN route from the received MP-BGP route if it is determined that an EVPN route is carried in the MP-BGP route according to the private network identifier carried in the received MP-BGP route.

The creating unit 503 is configured to create a route entry containing the address of the second VM by: creating a route entry containing the address of the second VM and corresponding to the first VPN when it is determined that a first VPN corresponding to a RT carried in the second EVPN route exists on the first VTEP.

The sending unit 502 is specifically configured to forward the second EVPN route to the second VTEP in the following manner:

in the case that the second VTEP belongs to the second EVPN, the sending unit 502 may carry the second EVPN route in an MP-BGP route and send the MP-BGP route to the second VTEP, where the sent MP-BGP route carries a private network identifier to indicate that the MP-BGP route carries an EVPN route; and in the case that the second VTEP belongs to the first EVPN, the sending unit 502 may forward the second EVPN route to the second VTEP.

Figure 6:
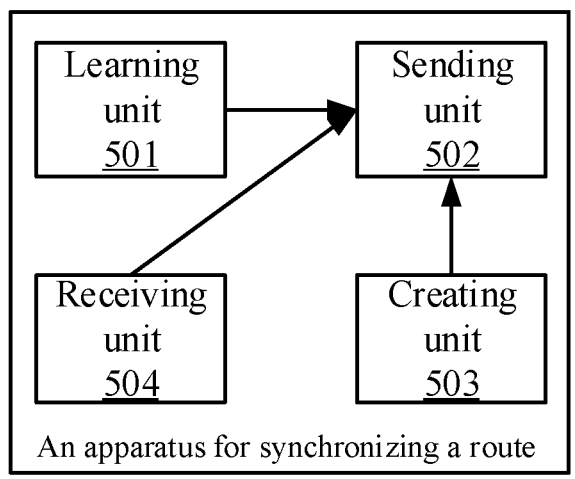
FIG. 6 is a schematic diagram illustrating another functional structure of an apparatus for synchronizing a route according to an example of the present disclosure.

As shown in FIG. 6, the above apparatus for synchronizing a route may further include: a receiving unit 504 configured to receive a third EVPN route.

The sending unit 502 is specifically configured to forward the third EVPN route to a VTEP in the second EVPN by: replacing a Route Distinguisher RD carried in the third EVPN route with an RD corresponding to a second VPN to which an ingress port of the third EVPN route belongs, adding a RT corresponding to the second VPN to the third EVPN route, and forwarding the third EVPN route to a VTEP establishing an EVPN neighbor relationship with the second VTEP.

The sending unit 502 is specifically configured to forward the third EVPN route to a VTEP in an EVPN of a different level from the second EVPN by: carrying the third EVPN route in an MP-BGP route and forwarding the MP-BGP route to a VTEP that is in the third VPN and establishing an MP-BGP neighbor relationship with the second VTEP if it is determined that a third VPN corresponding to the RT carried in the third EVPN route exists on the second VTEP.

Implementation procedures of functions and effects of different units in the above apparatus may be referred to corresponding blocks of the above method, which will not be described here redundantly.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of synchronizing a route, comprising:
   learning, by a first Virtual eXtensible LAN VXLAN Tunnel End Point VTEP in a first Ethernet Virtual Private Network EVPN, an address of a first Virtual Machine VM connected with the first VTEP;
   sending, by the first VTEP, the learned address of the first VM to a second VTEP connected with the first VTEP via a first EVPN route,
      wherein, the first EVPN route carries a destination IP address for establishing a VXLAN tunnel, and the destination IP address is an IP address of the first VTEP, and
      wherein, the second VTEP belongs to any of the first EVPN and a second EVPN of a different level from the first EVPN;
   receiving, by the first VTEP, a second EVPN route carrying an address of a second VM and a destination IP address for establishing a VXLAN tunnel;
   creating, by the first VTEP, a route entry containing the address of the second VM, wherein next hop information contained in the route entry is the destination IP address carried in the second EVPN route; and
   establishing, by the first VTEP, a VXLAN tunnel between the first VTEP and a VTEP identified by the destination IP address carried in the second EVPN route,
      wherein an EVPN neighbor relationship is established between VTEPs in a same EVPN, and
      a Multiprotocol Border Gateway Protocol MP-BGP neighbor relationship is established between VTEPs in EVPNs of different levels.

2. The method according to claim 1, wherein in the case that the second VTEP belongs to the second EVPN,
   sending the learned address of the first VM to the second VTEP via the first EVPN route comprises:
   carrying, by the first VTEP, the first EVPN route in an MP-BGP route, and sending the MP-BGP route to the second VTEP, wherein a private network identifier in the MP-BGP route is used to indicate that the MP-BGP route carries an EVPN route.

3. The method according to claim 2, wherein the first VTEP receives the second EVPN route in any of the following manners:
   receiving, by the first VTEP, the second EVPN route from a VTEP establishing an EVPN neighbor relationship with the first VTEP; or
   receiving, by the first VTEP, the MP-BGP route from a VTEP establishing an MP-BGP neighbor relationship with the first VTEP, and
   acquiring, by the first VTEP, the second EVPN route from the received MP-BGP route in the case of determining that an EVPN route is carried in the MP-BGP route according to the private network identifier carried in the received MP-BGP route.

4. The method according to claim 1, wherein creating the route entry containing the address of the second VM comprises:
   creating, by the first VTEP, the route entry containing the address of the second VM and corresponding to a first VPN when determining that the first VPN corresponding to a Route Target RT carried in the second EVPN route exists on the first VTEP.

5. The method according to claim 1, further comprising:
   in the case that the second VTEP belongs to the first EVPN,
      forwarding, by the first VTEP, the second EVPN route to the second VTEP; and
   in the case that the second VTEP belongs to the second EVPN,
      carrying, by the first VTEP, the second EVPN route in an MP-BGP route, and sending the MP-BGP route to the second VTEP, wherein the sent MP-BGP route carries a private network identifier used to indicate that the MP-BGP route carries an EVPN route.

6. The method according to claim 1, wherein in the case that the second VTEP belongs to the second EVPN, the method further comprises:
receiving, by the second VTEP, a third EVPN route;
forwarding, by the second VTEP, the third EVPN route to a VTEP in the second EVPN, comprising:
replacing, by the second VTEP, a Route Distinguisher RD carried in the third EVPN route with an RD corresponding to a second VPN to which an ingress port of the third EVPN route belongs, adding a Route Target RT corresponding to the second VPN to the third EVPN route, and forwarding the third EVPN route to a VTEP establishing an EVPN neighbor relationship with the second VTEP; and
forwarding, by the second VTEP, the third EVPN route to a VTEP in an EVPN of a different level from the second EVPN, comprising:
carrying, by the second VTEP, the third EVPN route in an MP-BGP route and forwarding the MP-BGP route to a VTEP that is in a third VPN and establishes an MP-BGP neighbor relationship with the second VTEP when the second VTEP determines that the third VPN corresponding to the RT carried in the third EVPN route exists on the second VTEP.

7. An apparatus for synchronizing a route, comprising:
a processor, and
a non-transitory machine-readable storage medium storing machine-executable instructions executable by the processor,
wherein the processor is caused by the machine-executable instructions to:
learn an address of a first Virtual Machine VM connected with a first Virtual eXtensible LAN VXLAN Tunnel End Point VTEP;
send the learned address of the first VM to a second VTEP connected with the first VTEP via a first Ethernet Virtual Private Network EVPN route,
wherein, the first EVPN route carries a destination IP address for establishing a VXLAN tunnel, and the destination IP address is an IP address of the first VTEP, and
wherein, the second VTEP belongs to any of the first EVPN and a second EVPN of a different level from the first EVPN;
receive a second EVPN route carrying an address of a second VM and a destination IP address for establishing a VXLAN tunnel;
create a route entry containing the address of the second VM, wherein next hop information contained in the route entry is the destination IP address carried in the second EVPN route; and
establish a VXLAN tunnel between the first VTEP and a VTEP identified by the destination IP address carried in the second EVPN route,
wherein an EVPN neighbor relationship is established between VTEPs in a same EVPN, and
a Multiprotocol Border Gateway Protocol MP-BGP neighbor relationship is established between VTEPs in EVPNs of different levels.

8. The apparatus for synchronizing a route according to claim 7, wherein when creating the route entry containing the address of the second VM, the processor is caused to:
create the route entry containing the address of the second VM and corresponding to a first VPN when determining that the first VPN corresponding to a Route Target RT carried in the second EVPN route exists on the first VTEP.

9. A non-transitory machine-readable storage medium storing machine-executable instructions, wherein the machine-executable instructions are invoked an executed by a processor to:
learn an address of a first Virtual Machine VM connected with a first Virtual eXtensible LAN VXLAN Tunnel End Point VTEP;
send the learned address of the first VM to a second VTEP connected with the first VTEP via a first Ethernet Virtual Private Network EVPN route,
wherein, the first EVPN route carries a destination IP address for establishing a VXLAN tunnel, and the destination IP address is an IP address of the first VTEP, and
wherein, the second VTEP belongs to any of the first EVPN and a second EVPN of a different level from the first EVPN;
receive a second EVPN route carrying an address of a second VM and a destination IP address for establishing a VXLAN tunnel;
create a route entry containing the address of the second VM, wherein next hop information contained in the route entry is the destination IP address carried in the second EVPN route; and
establish a VXLAN tunnel between the first VTEP and a VTEP identified by the destination IP address carried in the second EVPN route,
wherein an EVPN neighbor relationship is established between VTEPs in a same EVPN, and
a Multiprotocol Border Gateway Protocol MP-BGP neighbor relationship is established between VTEPs in EVPNs of different levels.

10. The apparatus for synchronizing a route according to claim 9, wherein in the case that the second VTEP belongs to the second EVPN, when sending the learned address of the first VM to the second VTEP via the first EVPN route, the processor is caused to:
carry the first EVPN route in an MP-BGP route and send the MP-BGP route to the second VTEP, wherein a private network identifier in the MP-BGP route is used to indicate that the MP-BGP route carries an EVPN route.

11. The apparatus for synchronizing a route according to claim 10, wherein when receiving the second EVPN route, the processor is caused to:
receive the second EVPN route from a VTEP establishing an EVPN neighbor relationship with the first VTEP; or
receive the MP-BGP route from a VTEP establishing an MP-BGP neighbor relationship with the first VTEP, and acquire the second EVPN route from the received MP-BGP route in the case of determining that an EVPN route is carried in the MP-BGP route according to the private network identifier carried in the received MP-BGP route.

12. The apparatus for synchronizing a route according to claim 9, wherein the processor is further caused to:
in the case that the second VTEP belongs to the first EVPN,
forward the second EVPN route to the second VTEP; and
in the case that the second VTEP belongs to the second EVPN,
carry the second EVPN route in an MP-BGP route, and send the MP-BGP route to the second VTEP, wherein the sent MP-BGP route carries a private network identifier used to indicate that the MP-BGP route carries an EVPN route.

13. The apparatus for synchronizing a route according to claim 9, wherein in the case that the second VTEP belongs to the second EVPN, the processor is further caused to:
receive a third EVPN route;
forward the third EVPN route to a VTEP in the second EVPN, comprising:
replace a Route Distinguisher RD carried in the third EVPN route with an RD corresponding to a second VPN to which an ingress port of the third EVPN route belongs, add a Route Target RT corresponding to the second VPN to the third EVPN route, and forward the third EVPN route to a VTEP establishing an EVPN neighbor relationship with the second VTEP; and
forward the third EVPN route to a VTEP in an EVPN of a different level from the second EVPN, comprising:
carry the third EVPN route in an MP-BGP route and forward the MP-BGP route to a VTEP that is in a third VPN and establishes an MP-BGP neighbor relationship with the second VTEP when it is determined that the third VPN corresponding to the RT carried in the third EVPN route exists on the second VTEP.

14. The non-transitory machine-readable storage medium according to claim 9, wherein in the case that the second VTEP belongs to the second EVPN, when sending the learned address of the first VM to the second VTEP via the first EVPN route, the processor is caused to:
carry the first EVPN route in an MP-BGP route and send the MP-BGP route to the second VTEP, wherein a private network identifier in the MP-BGP route is used to indicate that the MP-BGP route carries an EVPN route.

15. The non-transitory machine-readable storage medium according to claim 14, wherein when receiving the second EVPN route, the processor is caused to:
receive the second EVPN route from a VTEP establishing an EVPN neighbor relationship with the first VTEP; or
receive the MP-BGP route from a VTEP establishing an MP-BGP neighbor relationship with the first VTEP, and acquire the second EVPN route from the received MP-BGP route in the case of determining that an EVPN route is carried in the MP-BGP route according to the private network identifier carried in the received MP-BGP route.

16. The non-transitory machine-readable storage medium according to claim 9, wherein when creating the route entry containing the address of the second VM, the processor is caused to:
create the route entry containing the address of the second VM and corresponding to a first VPN when determining that the first VPN corresponding to a Route Target RT carried in the second EVPN route exists on the first VTEP.

17. The non-transitory machine-readable storage medium according to claim 9, wherein the processor is further caused to:
in the case that the second VTEP belongs to the first EVPN,
forward the second EVPN route to the second VTEP; and
in the case that the second VTEP belongs to the second EVPN,
carry the second EVPN route in an MP-BGP route, and send the MP-BGP route to the second VTEP, wherein the sent MP-BGP route carries a private network identifier used to indicate that the MP-BGP route carries an EVPN route.

18. The non-transitory machine-readable storage medium according to claim 9, wherein in the case that the second VTEP belongs to the second EVPN, the processor is further caused to:
receive a third EVPN route;
forward the third EVPN route to a VTEP in the second EVPN, comprising:
replace a Route Distinguisher RD carried in the third EVPN route with an RD corresponding to a second VPN to which an ingress port of the third EVPN route belongs, add a Route Target RT corresponding to the second VPN to the third EVPN route, and forward the third EVPN route to a VTEP establishing an EVPN neighbor relationship with the second VTEP; and
forward the third EVPN route to a VTEP in an EVPN of a different level from the second EVPN, comprising:
carry the third EVPN route in an MP-BGP route and forward the MP-BGP route to a VTEP that is in a third VPN and establishes an MP-BGP neighbor relationship with the second VTEP when it is determined that the third VPN corresponding to the RT carried in the third EVPN route exists on the second VTEP.

* * * * *